June 20, 1933.  F. KINNA, NÉE RUTGERUS ET AL  1,914,606

DENTAL PLATE

Filed April 13, 1931

Inventors
Franziska Kinna nee Rutgerus.
Heinrich Hasemeier.

Patented June 20, 1933

1,914,606

UNITED STATES PATENT OFFICE

FRANZISKA KINNA, NÉE RUTGERUS AND HEINRICH HAGEMEIER, OF HAMBURG, GERMANY

DENTAL PLATE

Application filed April 13, 1931, Serial No. 529,758, and in Germany February 17, 1931.

In order to render dental plates more comfortable and more capable of retaining their proper position on the gum, it has been proposed to provide them with suction pads of soft material.

The invention relates to a lower plate of this kind, and consists in covering the entire bearing surface of the plate with soft leather which is cemented in position and arranged to face the gum with its flesh side.

Figure 1:
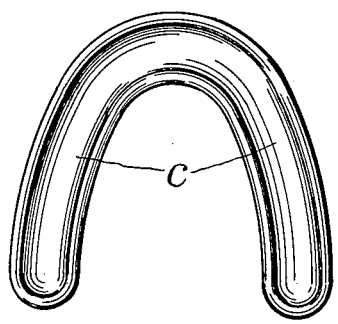
Figure 2:
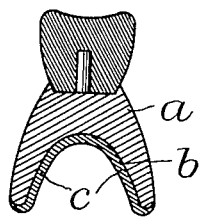

Fig. 1 of the accompanying drawing is a bottom view of a plate according to the invention, and Fig. 2 is a cross-section of the same on a larger scale.

A lower dental plate $a$, made in any suitable known manner, has its entire bearing surface $b$ covered with a layer $c$ of soft leather. The flesh side of the leather is arranged to face the gum. The leather layer is cemented in position, preferably by means of a celluloid lacquer and in a bisected mould under elastic pressure.

This padding, which may be applied to plates already in use as well as to new ones, is particularly serviceable and will act efficiently in connection with high as well as with flat gums.

The device may be modified within the scope of the invention.

We claim:

A dental plate of the character described having a bearing surface covered entirely with soft leather cemented to the plate and arranged to face the gum with its flesh side.

FRANZISKA KINNA, née RUTGERUS.
HEINRICH HAGEMEIER.